US012407130B2

(12) United States Patent
Shanbhag

(10) Patent No.: US 12,407,130 B2
(45) Date of Patent: Sep. 2, 2025

(54) FLAT FLEXIBLE CABLE SEAL AND METHOD

(71) Applicant: TE Connectivity Solutions GmbH, Steinach (CH)

(72) Inventor: Raghunandan Shrikanth Shanbhag, Bangalore (IN)

(73) Assignee: TE Connectivity Solutions GmbH (CH)

(*) Notice: Subject to any disclaimer, the term of this patent is extended or adjusted under 35 U.S.C. 154(b) by 344 days.

(21) Appl. No.: 18/155,323

(22) Filed: Jan. 17, 2023

(65) Prior Publication Data

US 2024/0178609 A1 May 30, 2024

(30) Foreign Application Priority Data

Nov. 18, 2022 (IN) ............................ 202241066186

(51) Int. Cl.
*H01R 13/52* (2006.01)
*H01R 12/77* (2011.01)
*H01R 43/00* (2006.01)

(52) U.S. Cl.
CPC ....... *H01R 13/5205* (2013.01); *H01R 12/771* (2013.01); *H01R 43/005* (2013.01)

(58) Field of Classification Search
CPC .......................... H01R 13/5205; H01R 12/771
USPC .......................................................... 439/499
See application file for complete search history.

(56) References Cited

U.S. PATENT DOCUMENTS 6,851,970 B2 * 2/2005 Yamanashi .......... H01R 12/592 439/499
2013/0137293 A1 * 5/2013 Miura ................ H01R 13/5205 439/499

* cited by examiner

*Primary Examiner* — Tulsidas C Patel
*Assistant Examiner* — Thaslimur Rahman

(57) ABSTRACT

A flat flexible cable (FFC) seal comprises an elastomeric body defining a generally hollow interior space. The body includes a first seal portion surrounding the interior space and comprising an outwardly extending first sealing rib. A cavity is formed into the first seal portion in an axial direction and is sized to receive a portion of a connector component. The body further includes a second seal portion surrounding the interior space and comprising an outwardly extending second sealing rib. The second seal portion extends in the axial direction of the body from an end of the first seal portion. The second seal portion is foldable into the interior space of, and generally under, the first seal portion such that that second sealing rib extends inward into the interior space.

20 Claims, 3 Drawing Sheets

FLAT FLEXIBLE CABLE SEAL AND METHOD

CROSS-REFERENCE TO RELATED APPLICATIONS

This application claims the benefit of the filing date under 35 U.S.C. § 119(a)-(d) of Indian Patent Application number 202241066186 filed Nov. 18, 2022.

FIELD OF THE INVENTION

The present invention relates to electrical devices, and more particularly, to a seal for a flat flexible cable.

BACKGROUND

Flat flexible cables (FFCs) or flat flexible circuits are electrical components consisting of at least one conductor (e.g., a metallic foil conductor) embedded within a thin, flexible strip of insulation. Flat flexible cables are gaining popularity across many industries due to advantages offered over their traditional "round wire" counter parts. Specifically, in addition to having a lower profile and lighter weight, FFCs enable the implementation of large circuit pathways with significantly greater ease compared to a round wire-based architectures. As a result, FFCs are being considered for many complex and/or high-volume applications, including wiring harnesses, such as those used in automotive manufacturing.

A critical obstacle preventing the implementation of FFCs into these applications includes the need to develop quick, robust, and low resistance termination techniques which enable an FFC to be mating with various components. Moreover, these applications often subject the FFCs and their associated connectors to harsh environmental contaminants, such as dirt and moisture. Accordingly, reliably terminating the FFCs includes sealing their connectors from these elements. However, reliably creating a seal about an FFC, as well as sealing the mating connectors associated therewith, has proven challenging. In particular, forming the small sealing features on an internal surface of the seal needed for reliably sealing against the thin FFC has shown to be difficult.

Accordingly, cost effective and reliable solutions for sealing FFC assemblies are desired.

SUMMARY

In one embodiment of the present disclosure, a flat flexible cable (FFC) seal comprises an elastomeric body defining a generally hollow interior space. The body includes a first seal portion surrounding the interior space and defining an outwardly extending first sealing rib. A cavity is formed into the first seal portion in an axial direction and is sized to receive a portion of a connector component. The body further includes a second seal portion surrounding the interior space and defining an outwardly extending second sealing rib. The second seal portion extends in the axial direction of the body from an end of the first seal portion. The second seal portion is foldable into the interior space of, and generally under, the first seal portion such that the second sealing rib extends inwardly into the interior space.

BRIEF DESCRIPTION OF THE DRAWINGS

The invention will now be described by way of example with reference to the accompanying Figures, of which.

DETAILED DESCRIPTION OF THE EMBODIMENTS

Figure 1:
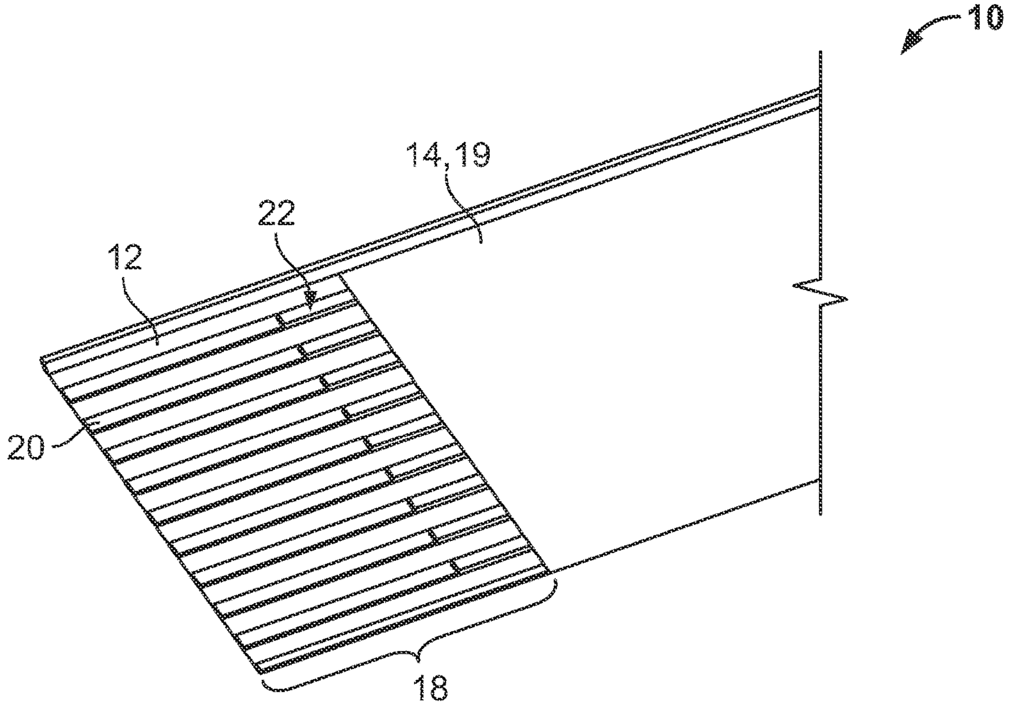
FIG. 1 is a perspective view of an exemplary FFC cable useful for describing embodiments of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 illustrates an exemplary portion (i.e., an end segment) of an FFC 10. The exemplary FFC 10 includes a plurality of conductors 12 embedded within an insulating material 14. The conductors 12 may comprise metallic sheet or foil, such as copper foil, by way of example only, patterned in any desirable configuration. The insulating material 14, such as a polymer insulating material, may be applied to either side of the conductors 12 via an adhesive, resulting in an embedded conductor arrangement. One or more portions or windows of the insulating material may be removed (or may not be initially applied) in select areas to expose sections of the otherwise embedded conductors 12. In the exemplary embodiment, a portion of a top surface 19 of the insulating material 14 has been removed to define a single continuous window 18 exposing the ends of each of the conductors 12 on a top side thereof, while a bottom portion 20 of the insulating material 14 remains present for added stability and strength. A plurality of openings 22 are formed through the FFC 10 between each pair of adjacent conductors 12. In one embodiment, the openings 22 may be sized and positioned to receive locking clips or latches of electrical terminals to be attached to the FFC 10.

Figure 2:
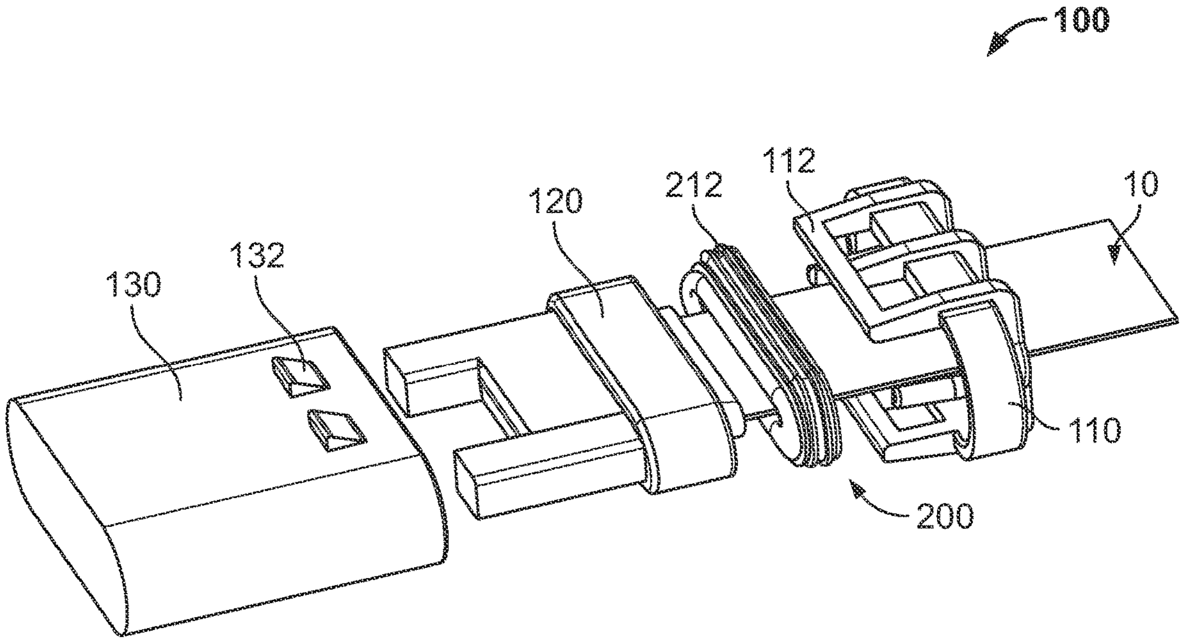
FIG. 2 is an exploded view of a connector assembly utilizing an FFC seal according to an embodiment of the present disclosure.

Referring to FIG. 2, an FFC assembly 100 according to an embodiment of the present disclosure includes an FFC 10 electrically connected to a plug housing 120. The plug housing is adapted to selectively connect to a mating connector or header 130. In order to seal the FFC/plug interface, a seal 200 according to an embodiment of the present disclosure is fitted over the FFC 10.

The assembly 100 further includes a cover 110, which may comprise a monolithic, polymer element formed via a molding process. The exemplary cover 110 defines at least one elastic latch 112 extending in a mating direction for engaging with a corresponding catch 132 formed on the header 130, and selectively fixing the cover 110 onto the header. The cover 110 further defines a slotted opening 117 on a front end thereof that is sized to receive the FFC 10 therethrough, and a rear opening 118 adapted to receive the header 130. See FIG. 6. When assembled, exterior sealing ribs 212 of the seal 200 abut or sealingly engage about its perimeter with an interior wall defining an opening in the header 130. Under a compressive force maintained by the engaged latches 112 and catches 132, one axial facing surface 221 (see FIG. 5) of the seal 200 engages the plug housing 120, with the opposite side engaging or abutting the cover 110.

It should be understood that the connector assembly shown in FIG. 2 is merely representative, and the FFC seals and methods of manufacturing the same described herein may be used in any other suitable application without departing from the scope of the present disclosure.

Prior art seals are typically molded with sealing features (e.g., ribs) facing externally to engage with a portion of a connector (e.g., the inside of the header 130), as well as internally for engaging with the surface of a cable (e.g., the FFC 10). However, as an adequate seal with the thin, flexible FFC requires much smaller sealing features, as well as different properties of the surrounding sealing material (e.g., less thickness, rigidity, etc.), effective seals molded in this manner are difficult to achieve. This is in part due to the tooling difficulties accompanying accurately forming the relatively small internal FFC sealing features.

Figure 3:
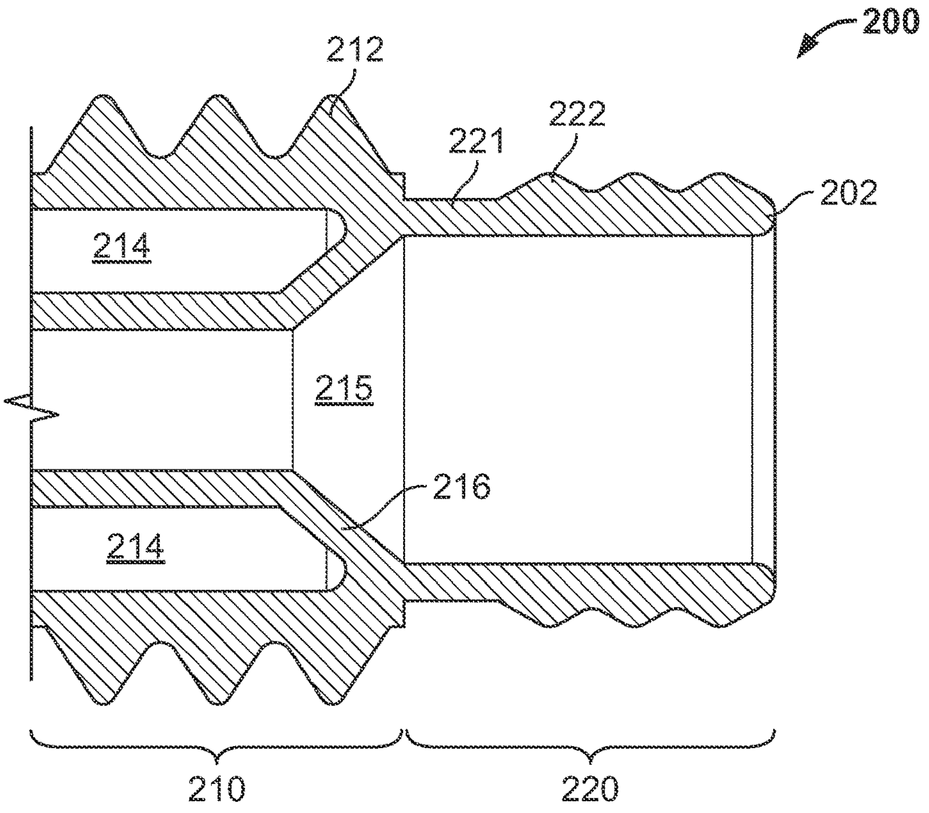
FIG. 3 is a cross-sectional view of the FFC seal of FIG. 2 in an as-manufactured state.
Figure 4:
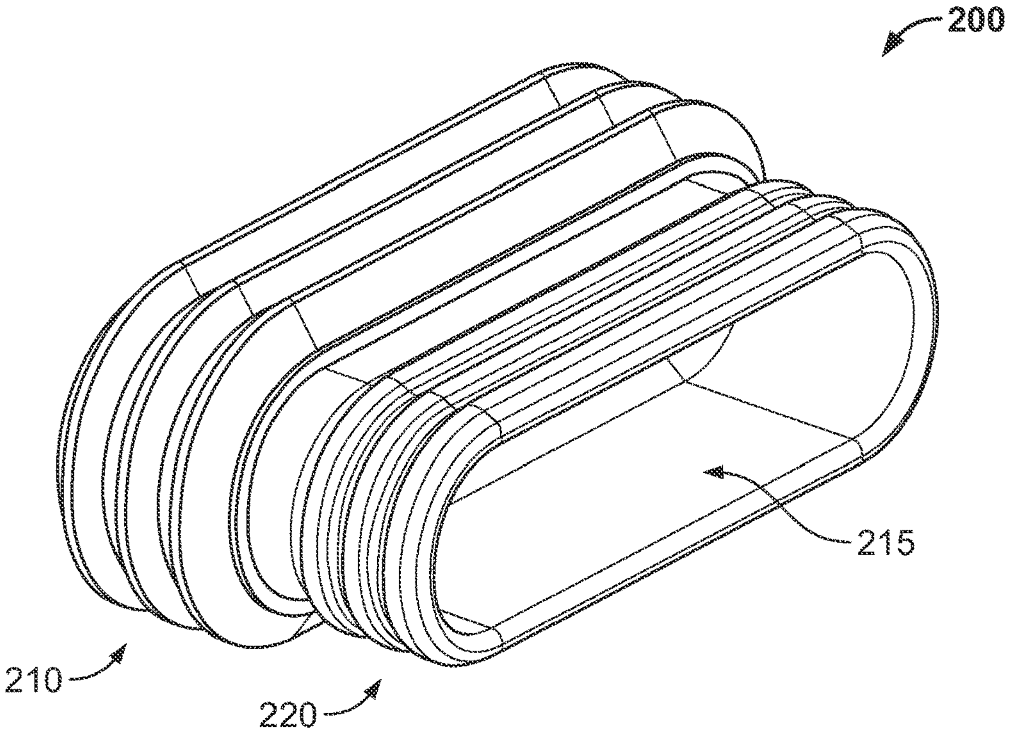
FIG. 4 is a perspective view of the FFC seal of FIG. 3.

Referring to FIGS. 3 and 4, embodiments of the present disclosure remedy these difficulties by molding the seal with its internal sealing features initially oriented externally, simplifying the molding/tooling process and allowing for optimized feature formation and characteristics. Specifically, the seal 200 according to embodiments of the present disclosure includes a body 202 defining an internal cavity 215 therethrough. The body 202 may be formed from flexible polymer material (e.g., silicon) having a relatively low shore durometer (e.g., 70-85 A).

The body 202 defines two distinct seal portions or zones. A first seal portion 210 is formed with external sealing ribs 212 extending about an exterior perimeter thereof. In the exemplary embodiment, each sealing rib 212 tapers in a radially outward direction for defining a sealing surface or tip. Either circumferentially about the body 202, or merely in sections, the first seal portion 210 defines cavities 214 therein which open in an axial direction. The cavities 214 are adapted to receive portions of a connector component therein, such as the cover 110 (see FIG. 6), providing both structural support for the seal 200, as well as positioning functions.

A second seal portion or zone 220 is formed adjacent the first portion 210, or extends from an end of the first portion in an axial direction. The second seal portion 220 comprises sealing ribs 222 about its periphery that are dimensionally smaller than the sealing ribs 212 of the first seal portion 210. The wall thickness of the second seal portion 220 is less than that of the first seal portion 210, as shown in FIG. 3. The internal cavity 215 of the body 202 is defined by an interior wall 216 thereof. The wall 216 extends or opens radially outwardly between the first seal portion 210 and the second seal portion 220. A folding portion or zone 221 is formed between the first seal portion 210 and the second seal portion 220, and defines a rib-less area in which the second seal portion 220 will be folded relative to the first seal portion 210.

As shown in FIG. 4, the seal 200 has a cross-section generally defined as a hollow stadium shape. A stadium shape is a shape consisting of a rectangle having semi-circular ends. This may also be descried as a type of rounded rectangle, or oblong ring shape. It should be understood that other seal cross-sections or shapes may be incorporated without departing from the scope of the present disclosure, however.

Figure 5:
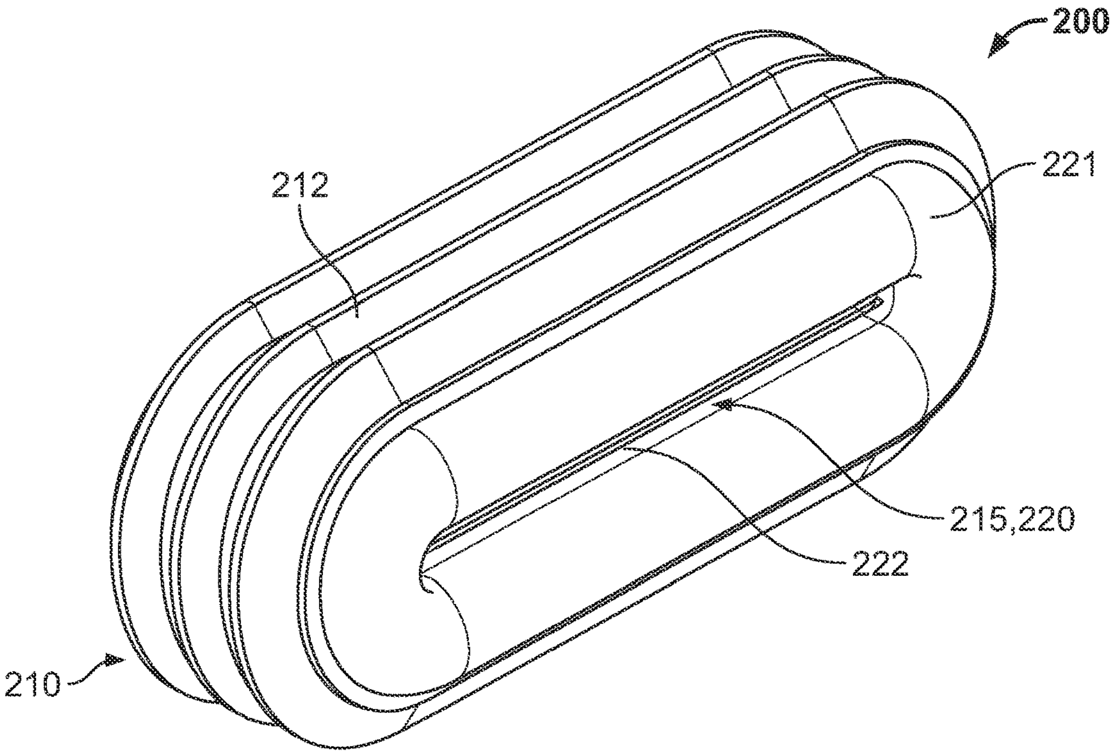
FIG. 5 is a perspective view of the FFC seal of FIGS. 3 and 4 in a ready to install, or folded, state.

According to embodiments of the present disclosure, after molding or otherwise manufacturing the seal in the form shown in FIGS. 3 and 4, and prior to being installed onto an FFC, the seal is folded into the form shown in FIG. 5. Specifically, the second seal portion 220 is folded or rolled into the first seal portion 210 such that the sealing ribs 222 thereof are oriented facing or extending inwardly into the internal cavity 215. This folding occurs at the folding portion 221 of the body 202, and results in this surface or portion at least partially facing in an axial direction in the form shown in FIG. 5.

Figure 6:
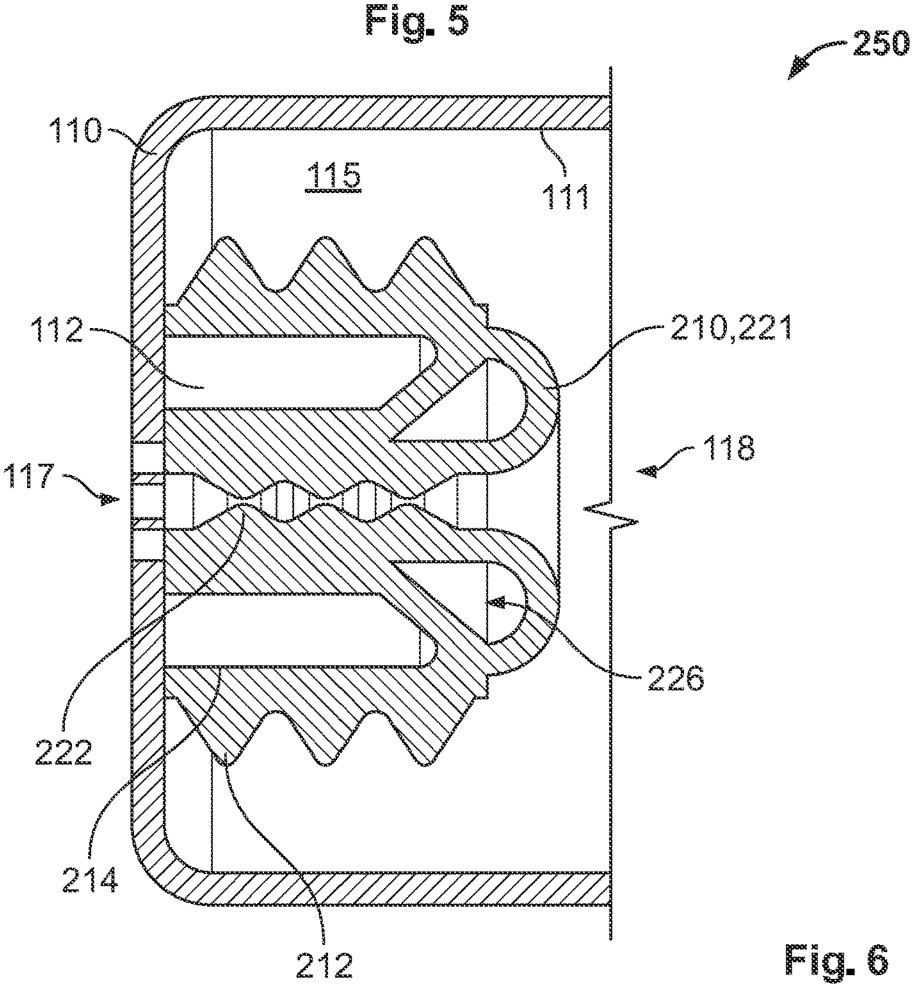
FIG. 6 is a cross-sectional view of the FFC seal of FIG. 5 as installed within a connector component.

Referring now to FIG. 6, a subassembly 250 including the seal 200 installed within the seal cover 110 of FIG. 2 is shown. The seal cover 110 includes projections 112 which engage with the cavities 214, securing the seal 200 to the cover. This arrangement also isolates the sealing surfaces defined by respective sealing ribs 212,222 from one another, allowing their relatively independent operation. The seal 200 creates a receiving space 115 about its perimeter sized to receive an end of the header 130, by way of example only, and generate a seal with an internal wall thereof via the sealing ribs 212. The now-internal sealing ribs 222 of the folded second sealing portion 220 align with the slotted opening 117 of the cover 110 for receiving the FFC therethrough. The folding portion 221 faces in an installation direction of the cover 110 for abutting, for example, the plug housing 120 of the assembly 100 shown in FIG. 1. Void spaces 226 defined in the folded seal 200 as a result of the tapering internal wall 216 (see FIG. 3) may improve seal flexibility or stiffness characteristics.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A flat flexible cable (FFC) seal, comprising:

an elastomeric body defining a generally hollow interior space and including:

a first seal portion surrounding the interior space and defining an outwardly extending first sealing rib, and a cavity formed into the first seal portion in an axial direction and sized to receive a portion of a connector component; and a second seal portion surrounding the interior space and defining an outwardly extending second sealing rib, the second seal portion extending in the axial direction of the body from an end of the first seal portion, the second seal portion being foldable into the interior space of and under the first seal portion such that that second sealing rib extends inwardly into the interior space.

2. The flat flexible cable (FFC) seal of claim 1, wherein the first seal portion defines a first thickness in a radial direction with respect to a central axis of the seal, and the second seal portion defines a second thickness in the radial direction, less than the first thickness.

3. The flat flexible cable (FFC) seal of claim 1, wherein the seal comprises a generally hollow, stadium shaped cross-section.

4. The flat flexible cable (FFC) seal of claim 1, wherein an internal wall of the body defining the interior space extends radially outward moving between the first seal portion and the second seal portion.

5. The flat flexible cable (FFC) seal of claim 1, wherein the cavity is formed on at least two sides of the first seal portion with respect to the interior space.

6. The flat flexible cable (FFC) seal of claim 1, wherein the first sealing rib comprises a first height in the radial direction, and the second sealing rib comprises a second height in the radial direction, less than the first height.

7. The flat flexible cable (FFC) seal of claim 6, wherein the first sealing rib comprises a plurality of first sealing ribs and the second sealing rib comprises a plurality of second sealing ribs.

8. A seal assembly for a flat flexible cable (FFC), including:

a connector component having a cable opening sized to receive an FFC; and a cable seal arranged within the connector component and defining an interior space corresponding to the cable opening, the cable seal defining:

a first seal portion surrounding the cable opening and comprising an outwardly extending first sealing rib; and a second seal portion extending from an end of the first seal portion and folded into the interior space and under the first seal portion, the second seal portion defining an inwardly extending second sealing rib adapted to engage with the FFC inserted into the cable opening of the component.

9. The seal assembly for a flat flexible cable (FFC) of claim 8, wherein the connector component is received within a connector opening defined in the cable seal.

10. The seal assembly for a flat flexible cable (FFC) of claim 9, wherein the connector opening is defined in the first seal portion.

11. The seal assembly for a flat flexible cable (FFC) of claim 10, wherein the connector opening opens in an axial direction.

12. The seal assembly for a flat flexible cable (FFC) of claim 8, wherein the connector component comprises a seal cover adapted to be secured to a connector body.

13. The seal assembly for a flat flexible cable (FFC) of claim 8, wherein the first sealing rib opposes an inner wall of the connector component.

14. The assembly of claim 8, further comprising an FFC arranged through the cable opening and through the interior space of the cable seal.

15. The seal assembly for a flat flexible cable (FFC) of claim 8, wherein the first sealing rib comprises a first height in the radial direction, and the second sealing rib comprises a second height in the radial direction, less than the first height.

16. The seal assembly for a flat flexible cable (FFC) of claim 8, wherein the cable seal comprises a generally hollow, stadium shaped cross-section.

17. A method of forming a seal for a flat flexible cable (FFC), comprising:

forming a first seal portion surrounding an interior space, the first seal portion comprising an outwardly extending first sealing rib about its periphery;

forming a second seal portion on an end of the first seal portion, the second seal portion comprising an outwardly extending second sealing rib about its periphery; and folding the second seal portion into the interior space and under the first seal portion such that the second sealing rib extends inwardly into the interior space.

18. The method of forming a seal for a flat flexible cable (FFC) of claim 17, further comprising the step of inserting an FFC into the interior space and into contact with the second sealing rib.

19. The method of forming a seal for a flat flexible cable (FFC) of claim 17, further comprising the step of forming a cavity in the first sealing portion.

20. The method of forming a seal for a flat flexible cable (FFC) of claim 19, further comprising the step of inserting a portion of an electrical connector into the cavity.

* * * * *